(12) United States Patent
Vock et al.

(10) Patent No.: US 7,840,378 B2
(45) Date of Patent: *Nov. 23, 2010

(54) MOBILE IMAGE CAPTURE SYSTEM

(75) Inventors: Curtis A. Vock, Boulder, CO (US); Perry Youngs, Longmont, CO (US); Adrian Larkin, Boulder, CO (US)

(73) Assignee: Nike, Inc., Beaverton, OR (US)

( * ) Notice: Subject to any disclaimer, the term of this patent is extended or adjusted under 35 U.S.C. 154(b) by 910 days.

This patent is subject to a terminal disclaimer.

(21) Appl. No.: 11/646,799

(22) Filed: Dec. 28, 2006

(65) Prior Publication Data

US 2007/0110278 A1 May 17, 2007

Related U.S. Application Data

(62) Division of application No. 09/607,678, filed on Jun. 30, 2000.

(60) Provisional application No. 60/141,794, filed on Jun. 30, 1999.

(51) Int. Cl.
*G06F 11/30* (2006.01)

(52) U.S. Cl. .................................... 702/182

(58) Field of Classification Search ............. 702/80, 702/104, 105, 110, 116, 122, 175, 182, 188; 340/937, 870.3; 482/8; 348/157, 158, 159; 455/11.1
See application file for complete search history.

(56) References Cited

U.S. PATENT DOCUMENTS

| | | | |
|---|---|---|---|
| 4,371,945 A | 2/1983 | Karr et al. | |
| 4,402,147 A | 9/1983 | Wu | |
| 4,510,704 A | 4/1985 | Johnson | |
| 4,578,769 A | 3/1986 | Frederick | |
| 4,699,379 A | 10/1987 | Chateau et al. | |
| 4,703,445 A | 10/1987 | Dassler | |
| 4,716,458 A * | 12/1987 | Heitzman et al. | ........... 348/115 |
| 4,736,312 A | 4/1988 | Dassler et al. | |
| 4,759,219 A | 7/1988 | Cobb et al. | |
| 4,771,394 A | 9/1988 | Cavanagh | |
| 4,824,107 A | 4/1989 | French | |
| 4,883,271 A | 11/1989 | French | |
| 4,956,628 A | 9/1990 | Furlong | |
| 5,033,013 A | 7/1991 | Kato et al. | |
| 5,343,445 A | 8/1994 | Cherdak | |
| 5,446,775 A | 8/1995 | Wright et al. | |
| 5,452,269 A | 9/1995 | Cherdak | |
| 5,471,405 A | 11/1995 | Marsh | |

(Continued)

OTHER PUBLICATIONS

"Nike, Inc.'s Answer and Affirmative Defenses to First Complaint"—from Civil Action No. 1:07-cv-00238-REB (a non-verified pleading filed by Nike in the Civil Action, with reference to parent Patent No. 7,171,331).

(Continued)

*Primary Examiner*—Mohamed Charioui
(74) *Attorney, Agent, or Firm*—Banner & Witcoff Ltd.

(57) ABSTRACT

A mobile image capture system, a system comprising: a sensing unit for attaching to a vehicle, the sensing unit having a camera constructed and arranged to view a participant on the vehicle, the camera capturing at least one image; and processing electronics for storing data representing the captured at least one image or for relaying data representing the captured at least one image to a computer or a network.

8 Claims, 10 Drawing Sheets

U.S. PATENT DOCUMENTS

| | | | |
|---|---|---|---|
| 5,500,635 A * | 3/1996 | Mott | 340/323 R |
| 5,513,854 A | 5/1996 | Daver | |
| 5,524,637 A | 6/1996 | Erickson | |
| 5,590,908 A | 1/1997 | Carr | |
| 5,605,336 A | 2/1997 | Gaoiran et al. | |
| 5,702,323 A | 12/1997 | Poulton | |
| 5,721,539 A | 2/1998 | Goetzl | |
| 5,723,786 A | 3/1998 | Klapman | |
| 5,724,265 A | 3/1998 | Hutchings | |
| 5,899,963 A | 5/1999 | Hutchings | |
| 5,925,001 A | 7/1999 | Hoyt et al. | |
| 5,929,335 A | 7/1999 | Carter | |
| 5,947,868 A | 9/1999 | Dugan | |
| 5,955,667 A | 9/1999 | Fyfe | |
| 5,978,972 A | 11/1999 | Stewart et al. | |
| 6,013,007 A | 1/2000 | Root et al. | |
| 6,018,705 A | 1/2000 | Gaudet et al. | |
| 6,102,832 A * | 8/2000 | Tani | 482/4 |
| 6,196,932 B1 | 3/2001 | Marsh et al. | |
| 6,204,813 B1 | 3/2001 | Wadell et al. | |
| 6,292,213 B1 * | 9/2001 | Jones | 348/61 |
| 6,305,221 B1 | 10/2001 | Hutchings | |
| 6,356,856 B1 | 3/2002 | Damen et al. | |
| 6,360,597 B1 | 3/2002 | Hubbard, Jr. | |

OTHER PUBLICATIONS

"Apple, Inc.'s Answer to Complaint, Counterclaims and Jury Demand"—from Civil Action No. 1:07-cv-00238-REB (a non-verified pleading filed by Apple, Inc. in the Civil Action, with reference to parent Patent No. 7,171,331).

"Nike, Inc.'s First Supplemental Statement Pursuant to Section 8.7.5.4 of the Settlement Agreement"—from JAMS Arbitration No. 1220035678 (filed by Nike, Inc. in the Arbitration proceeding, with reference to related Patent Nos. 6,499,000; 6,885,971; 7,072,789; and, 7,092,846).

Nobbe, Thomas A., "Olympic Athletes Get a Boost From Technology," Machine Design, Aug. 25, 1988.

* cited by examiner

```
Moving  : Boolean;
InAir   : Boolean;
Landing : Boolean;
Flying  : Boolean;   // Indicates the status of the vehicle Moving  := MotionIIRLevel > MotionThreshold;
InAir   := AirIIRLevel < AirThreshold;
Landing := SampleValue > ThumpThreshold;

if Moving AND InAir AND NOT Flying then
      Flying := true;              // Takeoff
      AirTimeSampleCount := 1;     // Start counting time in air
else if Flying and (InAir OR Landing) then
      if Landing then
            Flying := false;                  // Just landed
            AirTime := AirTimeSampleCount * SamplePeriod;
            if AirTime < MaximumAirtime then
                  RecordAirTime;
      else
            AirTimeSampleCount := AirTimeSampleCount + 1;
else
      Flying := false;
```

FIG. 1E

MOBILE IMAGE CAPTURE SYSTEM

RELATED APPLICATION

This application is a divisional of U.S. application Ser. No. 09/607,678, filed on Jun. 30, 2000, which claims priority to U.S. Provisional Application No. 60/141,794, filed on Jun. 30, 1999 and expressly incorporated herein by reference.

FIELD OF THE INVENTION

This invention relates to sports measurement sensors, event systems, and video systems; more particularly, the invention relates to various sports measurement metrics detected by sensors and relayed to an event system or personal display device and the production and use of video for spectator and/or training purposes.

BACKGROUND OF THE INVENTION

Sports participants, whether professional or amateur, as well as spectators desire more information about the performance of an athlete. United States patent application, entitled "Apparatus and Methods for Determining Loft Time and Speed," U.S. Pat. No. 5,636,146, by Peter Flentov, Dennis M. Darcy, and Curtis A. Vock, assigned to PhatRat Technology, Inc., filed on Nov. 21, 1994, issued on Jun. 3, 1997, and incorporated herein by reference provides some systems and methods for quantifying airtime and speed for athletic performance, especially in the sports of skiing and snowboarding.

Patent Cooperation Treaty (PCT) Application, entitled "Sport Monitoring System for Determining Airtime, Speed, Power Absorbed and Other Factors Such as Drop Distance," PCT Publication No. WO 98/54581, by Curtis A. Vock, Dennis M. Darcy, Andrew Bodkin, Perry Youngs, Adrian Larkin, Steven Finberg, Shawn Burke, and Charles Marshall, assigned to PhatRat Technology, Inc., filed on Jun. 2, 1998, published on Dec. 3, 1998, and incorporated herein by reference provides some additional systems and methods for quantifying athletic performance.

However, athletes and spectators desire new, quantifiable performance metrics, enhanced events systems, and use of visual images. For example, currently photographers can be found on the ski slopes at either the top or the bottom taking pictures, which can be later purchased at the end of the day from the Lodge. Whilst these are usually good quality photographs, they are not action images. Needed are new methods and apparatus to record a users performance from an action point of view as well as for other perspectives, and to distribute these recorded still and video images and video for entertainment and training purposes.

SUMMARY OF THE INVENTION

On embodiment of the invention includes a system comprising a sensing unit for attaching to a vehicle and processing electronics. The sensing unit has a camera constructed and arranged to view a participant or the vehicle, with the camera capturing at least one image. The processing electronics stores data representing the captured at least one image or relaying data representing the captured at least one image to a computer or a network.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 1E illustrates pseudo code for one embodiment for determining airtime;

DETAILED DESCRIPTION

Figure 1A:
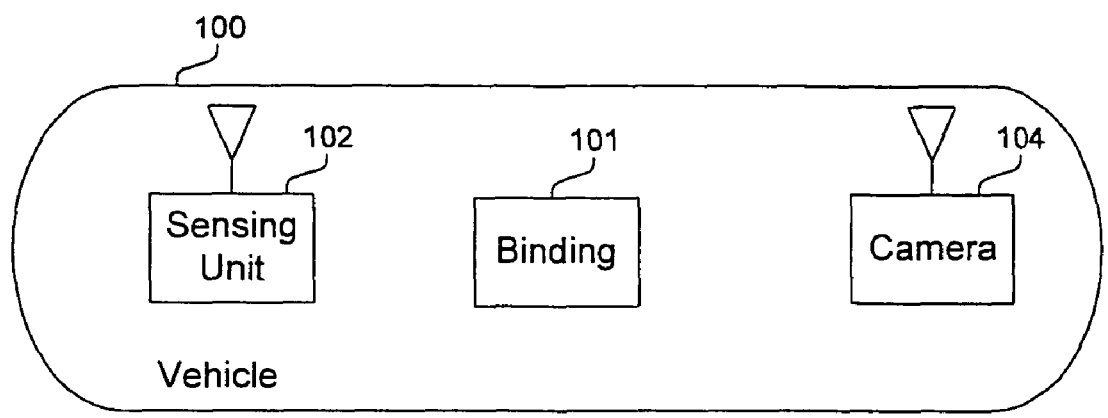
FIG. 1A is a diagram of one of many possible embodiments of a sports vehicle including a sensing unit and a camera.

Methods and apparatus are disclosed for detecting and measuring performance characteristics and metrics of participants and vehicles. These performance characteristics and metrics include, but not are limited to, airtime, g-force, spin, rotation, drop distance, acceleration, and video and still images. These vehicles include, but are not limited to a snowboard, ski, skateboard, wakeboard, motorcycle, bicycle, ice skates and rollerblades.

One embodiment provides a camera for providing near real-time images and video footage of a participant's actions on a vehicle. The camera may be located on the participant, the participant's vehicle or other equipment, or from some other observation point. The images recorded by the camera can be downloaded to a recording or other storage device to produce memorabilia (e.g., a CD ROM, or video cassette). If desired, the images can be sent in real-time through an event system and network (e.g., using a radio or other transmitter) to television, the Internet, and to other locations for producing the memorabilia or for providing images to television display devices, such as those located in a ski lodge for entertainment purposes or in a coach's or personal trainer's office for training purposes.

For example, a camera may be attached to a snowboard or user for recording a user's performance. The camera should be easily but securely attached to the user's vehicle or body. Multiple cameras can be used to record multiple views simultaneously, such as a view of the user, a forward and a reverse view. The recorded images can be then be optionally digitally processed, and then recorded onto a compact disc for playback on the user's personal computer.

One embodiment provides a system that monitors and tracks vehicle action for teaching and training purposes. For example, a sensing unit (e.g., airtime sensor, etc.) may be attached to a skateboarder so that real-time and delayed data can be determined in a skateboarding training exercise or event. Further, a sensing unit and/or data unit may include one or more translational and/or rotational accelerometers to provide additional information such as, but not limited to, maximum rotation of the vehicle, rotation of the person relative to the vehicle, flip information, scraping information (e.g., one side of the vehicle relative to the other side of the vehicle), and a time duration that a vehicle is on its side or at an edge of a ramp.

Sensing units typically contain one or more transducers with suitable conditioning, filtering and conversion electronics. They typically also contain a processor, a data logging system and primary and secondary communication channels. Their purpose is to measure and record a parameter or range of parameters for a participant's performance and communicate the results to an event system or personal display device (e.g., watch, pager, cell phone, PDA, etc.). When sensing units are used in an event or resort/park situations, they typically transmit their results to a base station either directly or via a relay. For personal use, sensing units typically either transmit or display their results to a personal display unit integrated into the sensing unit or on a receiving device (e.g., watch, pager, cell phone, PDA, etc.). In one embodiment, the primary communication channel will typically be a one way radio frequency link or direct cable connection, which is used to transmit data to the rest of the system. A secondary bi-directional infrared link may be included, which allows administration and control of the sensing unit and also provides a path for the logged data to be downloaded.

One embodiment provides airtime and other information (e.g., performance metrics) related to Baja racing or other wheeled vehicles, in real-time, if desired, to television, event systems or judging centers, and/or the drivers of these vehicles. An embodiment uses a sensor that mounts to the vehicle in one or more places to monitor the airtime for one or multiple wheels. Various embodiments employ contact closures, stress sensing devices, accelerometers, and/or devices that measure the position of a shock absorber or coil spring for a wheel of the vehicle.

FIG. 1A illustrates one embodiment of a vehicle 100. As shown, vehicle 100 may correspond to a snowboard or wake board. However, vehicle 100 could also be any moving or sport vehicle, such as, but not limited to, a snowboard, ski, skateboard, wakeboard, motorcycle, bicycle, ice skates or rollerblades. Vehicle 100 could also be an animal, such as a horse. Vehicle 100 includes a sensing unit 102 and a camera 104. Sensing unit 102 determines performance metrics or indicia thereof, which are typically stored within sensing unit 102 for later download and/or transmitted to a receiver system, such as one of the event systems described hereinafter. Camera 104 provides still and/or video action images of the participant or his performance. These images are typically stored within camera 104 for later download and/or immediate or delayed transmission to a receiver system, such as one of the event systems described hereinafter. If vehicle 100 corresponds to a snowboard for example, typically vehicle 100 includes a binding 101 for attaching vehicle 100 to a user.

Figure 1B:
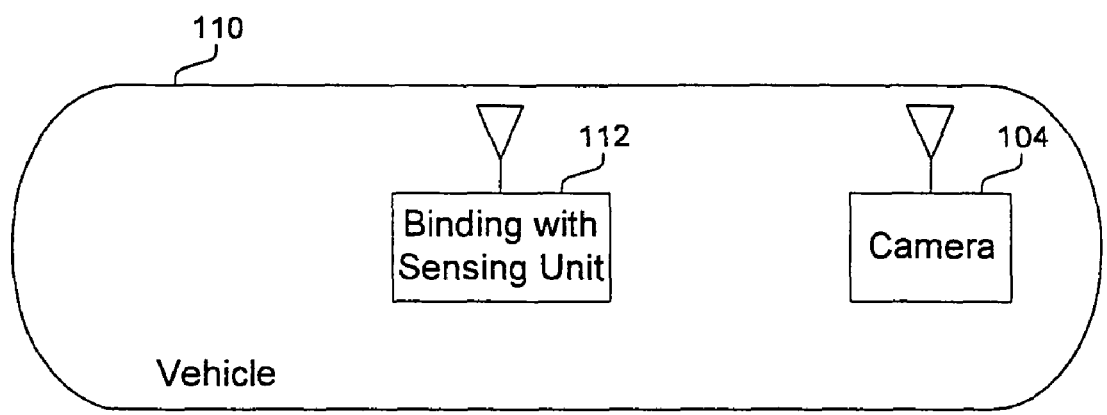
FIG. 1B is a diagram of a sports vehicle with a sensing unit built into a binding device for a user.

FIG. 1B illustrates one embodiment of a vehicle 110. Vehicle 110 includes a binding (or boot) with an attached sensing unit 112, as well as a camera 104 (previously described). By incorporating a sensing unit 112 having one or more pressure sensors, additional information such as power information and data relating to weight and balance techniques can be measured, stored, displayed and/or transmitted to an event or other receiver system. One pressure sensor suitable for use in a sensing unit 112 includes a peizo crystal or force sensing resistor.

Figure 1C:
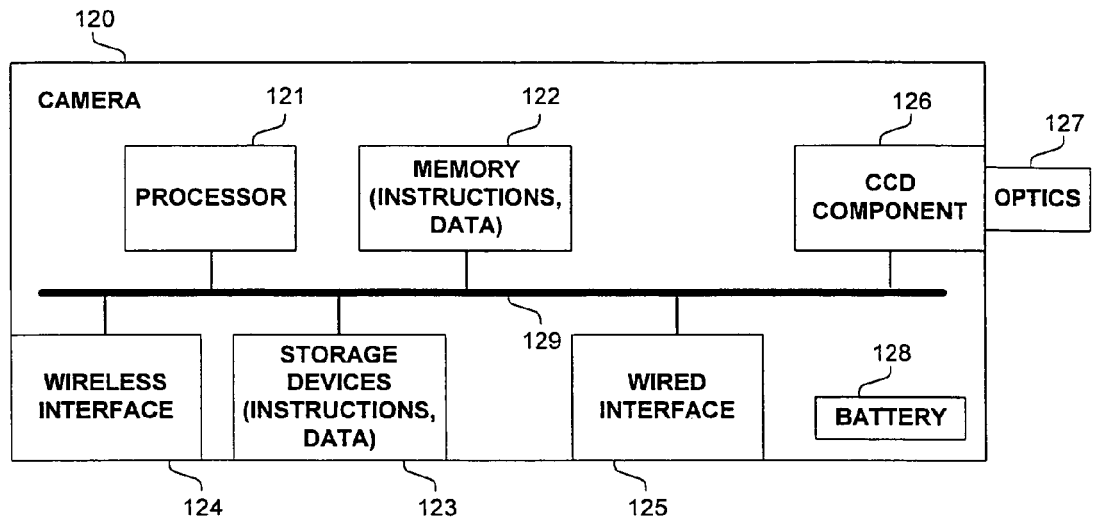
FIG. 1C is a diagram of a camera.

FIG. 1C illustrates a camera 120 which may be used to generate, record and transmit still or video images. In one embodiment, camera 120 comprises a processor 121, memory 122, storage devices 123, a wireless interface 124, a wired interface 125, a charge coupled device (CCD) component 126 and optics 127, battery 128 for supplying operating power to camera 120, and one or more internal communications mechanisms 129 (shown as a bus for illustrative purposes). Wireless interface 124 and wired interface 125 receive and send external signals to one or more event systems or communications devices or networks (e.g., one or more networks, including, but not limited to the Internet, intranets, private or public telephone, cellular, wireless, satellite, cable, local area, metropolitan area and/or wide area networks). Memory 122 is one type of computer-readable medium, and typically comprises random access memory (RAM), read only memory (ROM), integrated circuits, and/or other memory components. Memory 122 typically stores computer-executable instructions to be executed by processor 121 and/or data which is manipulated by processor 121 for implementing functionality in accordance with certain embodiments described herein. Storage devices 123 are another type of computer-readable medium, and typically comprise disk drives, diskettes, networked services, tape drives, flash sticks, and other storage devices. Storage devices 123 typically store computer-executable instructions to be executed by processor 121 and/or data which is manipulated by processor 121 for implementing functionality in accordance with certain embodiments described herein. For example, in one embodiment, data corresponding to performance indicia or measurements are stored in memory 122 and/or storage devices 123. Logging the image data in this manner allows for later processing, downloading and/or transmission.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

Figure 1D:
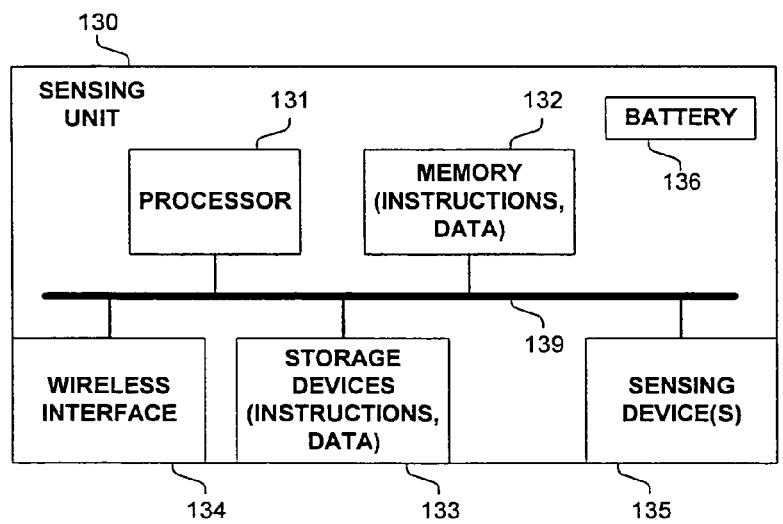
FIG. 1D is a block diagram of a sensing unit.

FIG. 1D illustrates a sensing unit 130 which may be used to generate, record and transmit detected performance indicia and measured performance metrics. In one embodiment, sensing unit 130 comprises a processor 131, memory 132, storage devices 133, a wireless interface 134, sensing device(s) 135, battery 136 for supplying operating power to sensing unit 130, and one or more internal communications mechanisms 139 (shown as a bus for illustrative purposes). Wireless interface 134 sends, and optionally receives signals to one or more event systems or communications devices or networks (e.g., one or more networks, including, but not limited to the Internet, intranets, private or public telephone, cellular, wireless, satellite, cable, local area, metropolitan area and/or wide area networks). Memory 132 is one type of computer-readable medium, and typically comprises random access memory (RAM), read only memory (ROM), integrated circuits, and/or other memory components. Memory 132 typically stores computer-executable instructions to be executed by processor 131 and/or data which is manipulated by processor 131 for implementing functionality in accordance with certain embodiments described herein. Storage devices 133 are another type of computer-readable medium, and typically comprise disk drives, diskettes, networked services, tape drives, flash sticks, and other storage devices. Storage devices 133 typically store computer-executable instructions to be executed by processor 131 and/or data which is manipulated by processor 131 for implementing functionality in accordance with certain embodiments described herein. For example, in one embodiment, data corresponding to performance indicia or measurements are stored in memory 132 and/or storage devices 133. By logging the data in this manner, performance parameters can be recorded for later processing and/or transmission. Moreover, these can be linked to video recordings to identify problem areas and leading to improvement in the user's performance. By way of example, performance data and video data may be downloaded to the Internet and data structures for later review or comparison of the user's data alone or with that of other athletes.

Sensing device(s) 135 may include accelerometers, stress sensors, magnetic field sensors, peizo foil sensors, pressure sensors, contact closures, global positioning system (GPS) devices, strain gauges, microphones, clocks, spectra, or any other sensing and/or measurement device. The exact device (s) incorporated into a sensing device 135 will typically correspond to the type of measurement desired. For example, magnetic field sensors and accelerometers, alone or in combination, can be used to measure rotation.

Each sensing unit 130 may contain a data logging data structure in memory 132 or storage devices 133, which will be used to record the performance data generated by a competitor during a run. It typically will have sufficient capacity to hold the data for an entire run. This performance data stored in this data structure can be extracted at the end of each run. One embodiment of this data structure uses a FIFO principle; hence it will be self-maintaining and need not be interrogated should this be found inconvenient or unnecessary.

In the limited cases where data is lost during a competitors run then each sensors can be interrogated immediately on completion of that run. Live data collected by each sensor unit will normally be transmitted in real-time through an event system in order that judging can take place as the action is happening and also so that a live feed of performance information can be provided to TV or other medium, e.g., Internet or radio. Should a sensing unit 130 be unable to communicate through its primary communication channel then the accumulated performance data held by the sensors logging subsystem can be data can be download when the competitor has completed his/her run. This would take place using a secondary communication channel implemented with a different signaling technology. Typically, the primary communication channel with uni-directional (transmit only), the secondary channel will be bi-directional and used for downloading data from the logger sub-system and uploading one time pads.

Should the failure of a sensing unit 130 be more severe then unit can be open and the logging sub-system be downloaded directly. Each unit in the data chain will have the facility to download its data via secondary link using an alternative signaling system. In most case the units will be using radio frequency or RS232/RS485 as their primary medium of communication. In addition, a sensing unit 130 may have the capability to download its data via a secondary data link, such as infrared signaling. This would normally be carried out each time the a run has been completed.

Sensing units 130 typically transmit use a cyclic redundancy checksum (CRC) as part of a message so a relay unit or base station can detect a transmission error. In some embodiments, one or more error correction techniques (e.g., forward error correction) are used, which may allow corrupted data to be automatically corrected. A sensing unit 130 can use bi-directional communication techniques, but typically sensing units 130 only transmit their data in a datagram fashion, so no acknowledgement is received. Therefore, a sensing unit 130 will typically transmit each data packet several times to increase the probability of the message being properly received by an event system.

Many different methods are employed by a sensing unit 130 to determine a performance metric, such as airtime. In one embodiment, the sensor signal is filtered to give a cutoff frequency well below the Nyquist frequency for the sampling rate of 9600 Hz. The signal is typically sampled using an eight-bit analogue to digital converter. The 9600 bytes of information per second are preferably reduced to a more manageable level of 40 bytes per second by a pre-processing algorithm. The absolute difference of the current sample value from the previous sample value is, for example, accumulated for 240 values into a 16-bit number. Due to the high sample rate and the low frequency signal, the difference is always relatively small, and the 16-bit accumulator does not overflow. After 240 sample differences have been accumulated, the sum is divided by four and limited to 255. This value gives a 'signal activity level' for the 25 ms period. This technique effectively ignores low frequency signal content and any digital offset component. These values are fed into two Infinite Impulse Response (IIR) digital filters to determine if the vehicle is moving and if the vehicle is in the air.

Certain flags can be used in determining a performance metric. By way of example, the Motion IIR accumulator is 16-bits. The 8-bit signal activity level value is added in, and then the accumulator is reduced by $\frac{1}{32}$nd of its current value. If the accumulator level is above a 'Motion Threshold', the vehicle is deemed to be in motion. The Air IIR accumulator is 16-bits. The 8-bit signal activity level value is added in, and then the accumulator is reduced by of its current value. If the accumulator level is below the 'Air Threshold', the vehicle is deemed to be in the air. A landing thump is flagged when the signal activity level is higher than the 'Thump Threshold'.

The above flags are monitored and the following algorithm determines if airtime is valid. In one embodiment, the rules for valid airtime are straight forward: the board must be in motion before the airtime starts; the board may be in motion after the airtime ends; a maximum of 5 seconds of airtime is recognized (for a typical event or competition); valid airtime ends with a Thump (i.e., a landing). Pseudo code for one embodiment is illustrated in FIG. 1E. While this may be a simplification of the full algorithm logic, it shows a basic mechanism for detection of airtime. The use of additional sensors will add additional qualifications to the algorithm transitions from Flying to Not Flying, and will reduce the number of airtimes detected incorrectly.

Certain embodiment employ certain enhancements, such as to help limit the effect of different signal levels on the algorithm outputs, the output value from the preprocessing can be limited to a certain value before being applied to the IIR filters. This limits the range of the filters, and restricts the effect of large signal inputs.

For certain events and embodiments, multiple sensing units 130 may be attached to participants and their vehicles. These multiple sensing units 130 may measure different performance metrics, or measure one or more of the same metrics as to provide some level of redundancy.

In one embodiment, sensing units 130 transmit a short block of data at relatively long intervals, for the remainder of the time the transmission band is free. By assigning different repeat patterns to each sensing unit 130 and repeating the same data a number of times then data loss due to overlapping messages can be virtually eliminated. In some embodiments, spread spectrum technology is used which typically provides higher reliability and security.

In one embodiment, each sensing unit and data link within an event system will facilitate or make use of encryption techniques to ensure the system cannot be subverted to the advantage of third parties such as competitors or gambling syndicates etc. The performance data in the system may be encrypted. In addition to, or in place of this encryption, Message Authentication Codes (MACs) may be included in the data streams. The MACs will accompany the data at all stages and locations within the event system including logging subsystems. The MACs will be used by a control center within an event system to establish the authenticity of any performance data received. In one embodiment, the performance data generated by a sensor unit within the event system will be grouped into blocks, a MAC will be generated for each block of data using that data. The MAC generation will be carried out by and within the sensor unit producing the data. The MAC will be an encrypted value derived from all the data within the block.

Additionally, in one embodiment, a system of One Time Pads (OTPs) is used to encrypt the Cyclic Redundancy Checksum (CRC) to generate the MAC instead of the processor intensive method common in standard encryption systems. Each byte of data within the data block will be used to generate the CRC for the block in addition a number of randomly selected bytes from the data block will be including in the CRC calculation a second time. This will prevent a third party from deriving the value of the entry of the OTP used to encrypt the CRC then using this information to generate a valid block of data and insert it into network without detection. Each entry in the OTP typically will consist of a pair of random numbers, one of the numbers will be used to select which data item are duplicated in the CRC, the other random number will be used to encrypt. This method allows a high level of data security while imposing a minimal processing burden where resources are at a premium. The OTP consists of a table of random numbers held in both the unit generating the data and the unit receiving the data. The table is unique to these two units and each entry in the table is only ever used once.

The rate at which MACs are included in the data stream, and hence the size of the data blocks, is determined by the amount of non-volatile storage available to hold the OTP and the frequency at which the OTP can be updated. It is not essential that the frequency of MACs is high.

Sensor units 130 may be uploaded with a unique and random OTP in a secure manner prior to each session the field unit might be used in. For this activity a single mobile security broker unit will be used this will generate a full set of OTPs for the entire event system for a session at an event. Each of the control units will be uploaded with a full set of OTPs. Once an OTP is loaded into a field unit and each of the control units it will be erased from the security brokers memory.

Figure 2A:
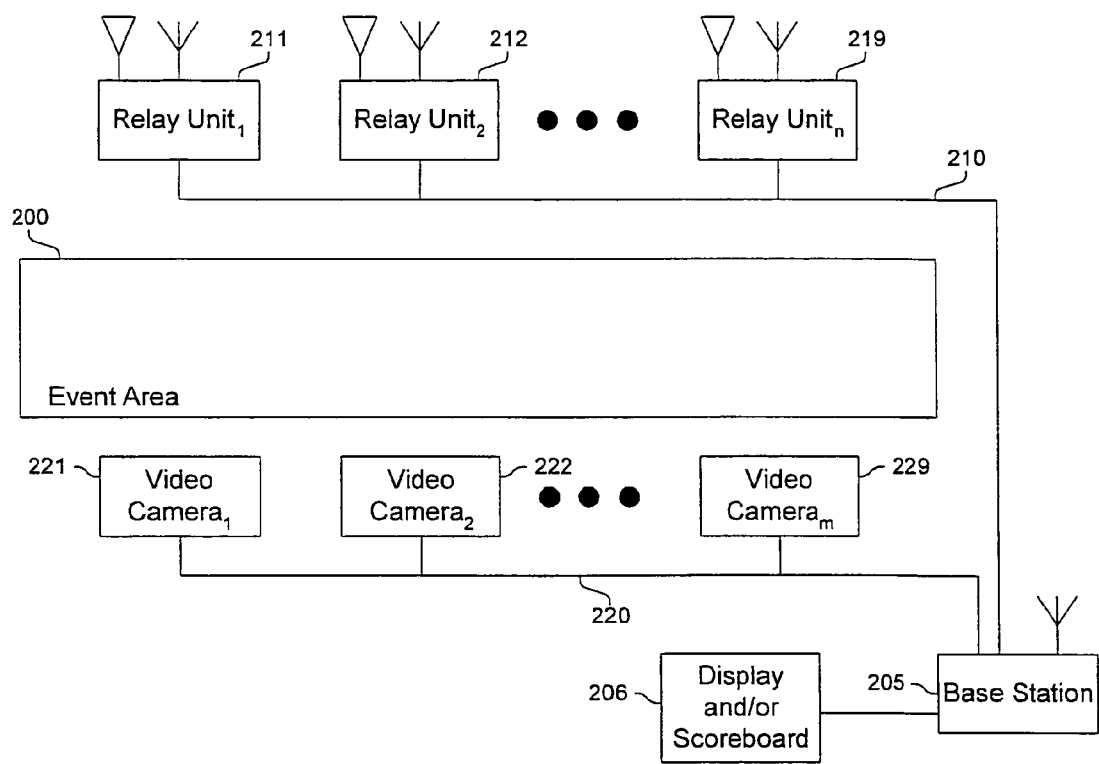
FIG. 2A is schematic diagram of an event system.

FIG. 2A illustrates one embodiment of an event system used to receive information, typically in real-time, from the performance of an event. FIG. 2A illustrates a typical configuration used at a sporting event (e.g., a snowboard event) performed in event area 200 (e.g., a snowy hill). A series of n relay units 211-219, where n is 0 or greater (0 meaning performance information is sent directly to base station 205), are used to receive transmitted performance information generated by a sensing unit (such as sensing unit 130 shown in FIG. 1D), which is relayed to a base station 205 for display on display and/or scoreboard 206, processing, and/or retransmission to another location. Use of relay units 211-219 provides a reliable channel for the event data from the competitors as well as operational information for monitoring and provisioning the event system. Relay units 211-219 communicate with base station 205 via radio signals and/or cable 210 (e.g., using RS 485 protocol).

In certain embodiments, where radio links are used to transfer data between units, then a suitable transmitter and receiver beam shape will be employed to maximize link reliability. In the case of units in the relay array, a high gain directional antenna will be typically employed with the beam focused within the appropriate section of the event arena. In the case of repeater units, an Omni directional antenna will typically be employed. This embodiment should decrease the probability of a lost transmission even as the participant's orientation varies with respect to the event system.

In one embodiment, an array of m video cameras 221-229, where m is 1 or greater, are placed along the event area 200 or at certain strategic locations (in addition to, or in place of relay units 211-219). Cameras 221-229 communicate with base station 205 via radio signals and/or cable 220 (e.g., using RS 485 protocol). Cameras 221-229 can be used to determine performance metrics, e.g., airtime, etc., by visually inspecting or digital processing the produced images.

The video cameras record events and then relay the events to a base station, which then might forward them to another device, such as a ski lodge video server so people in their rooms or in the lobby or bar can watch the action. In one embodiment, the event system automatically correlates participants having a sensing unit 130 (FIG. 1D) with recorded video by a video camera 221-229 based on a detected location of a sensing unit 130. Typically, this location is determined by a radio reception signal strength at a relay unit 211-219, or based on transmitted location by sensing unit 130 (e.g., when the sensing unit 130 includes a GPS sensing device). In one embodiment, the video camera is running continuously, which may be a boon for security of the park. Sensing unit 130's transmission identifies the user by name, and supplies performance information to be combined with the video recordings. A computer system, such as base station 205, can take the video clips and produce a 'Days Best' sequence of say 100 clips that play cyclically in the lodge. It can, for example, limit the number of clips of a single individual to his three best to give the rest of the participants a chance to get on the video board. The raw or combined video can then be recorded on CD for the paying customer or he can have only his individual shots (more than the three best limit) put onto the CD.

Moreover, performance data received from a sensing unit by an event system may be correlated with image data received by the event system. In one embodiment, data received from camera and sensing devices is time-stamped for later correlation and retrieval purposes, and/or marked with data identifying a participant or sensing unit. In one embodiment, the time value associated with at least some of the received performance or image data is adjusted based on a calculated, received, or some predetermined delay value. For example, a sensing unit or camera might add a relative delay time value to data it sends so the event system will be able to determine an "actual" time of occurrence. In this manner, events can be correlated based on a common time reference, such as that of the event system. In another embodiment, the clocks of sensing devices and cameras are routinely synchronized so that they can independently time-stamp data based on a common time reference, which will allow data received from different devices to be correlated.

Figure 2B:
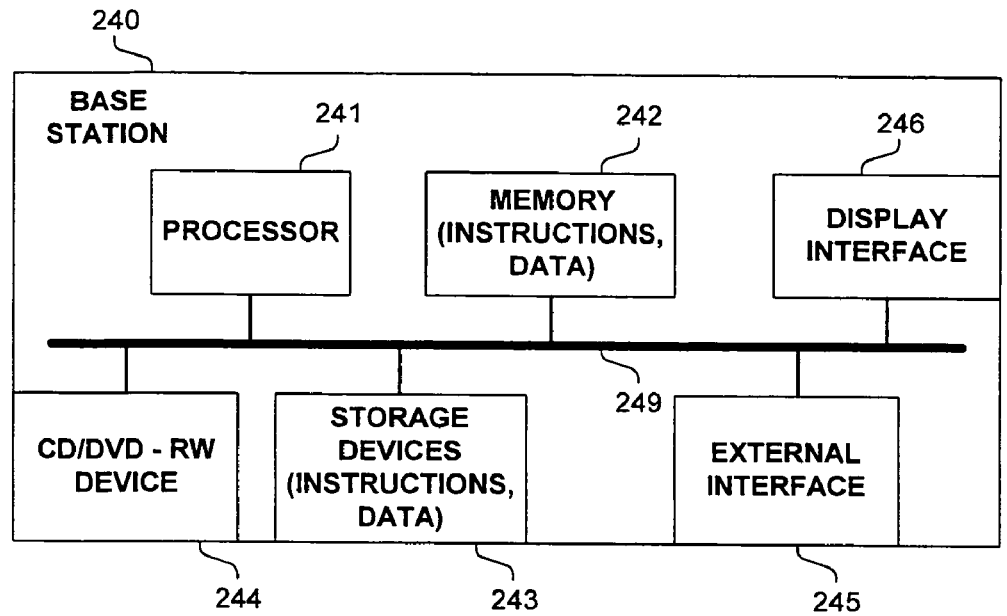
FIG. 2B is a block diagram of a base station.

FIG. 2B illustrates a base station 240 which may be used to receive, display, and record and transmit detected performance indicia, measured performance metrics, and video and still images. In one embodiment, base station 240 comprises a processor 241, memory 242, storage devices 243, a CD or DVD Read-Write Device 244, external interface 245 for receiving information via radio signals, via a cable (e.g., using RS 485 or RS 432) or via some other device or communication mechanism, display interface 246 (e.g., for a monitor or scoreboard) and one or more internal communications mechanisms 249 (shown as a bus for illustrative purposes). Memory 242 is one type of computer-readable medium, and typically comprises random access memory (RAM), read only memory (ROM), integrated circuits, and/or other memory components. Memory 242 typically stores computer-executable instructions to be executed by processor 241 and/or data which is manipulated by processor 241 for implementing functionality in accordance with certain embodiments described herein. Storage devices 243 are another type of computer-readable medium, and typically comprise disk drives, diskettes, networked services, tape drives, flash sticks, and other storage devices. Storage devices 243 typically store computer-executable instructions to be executed by processor 241 and/or data which is manipulated by processor 241 for implementing functionality in accordance with certain embodiments described herein. For example, in one embodiment, data corresponding to performance indicia or measurements or video or still images are stored in memory 242 and/or storage devices 243.

Figure 2C:
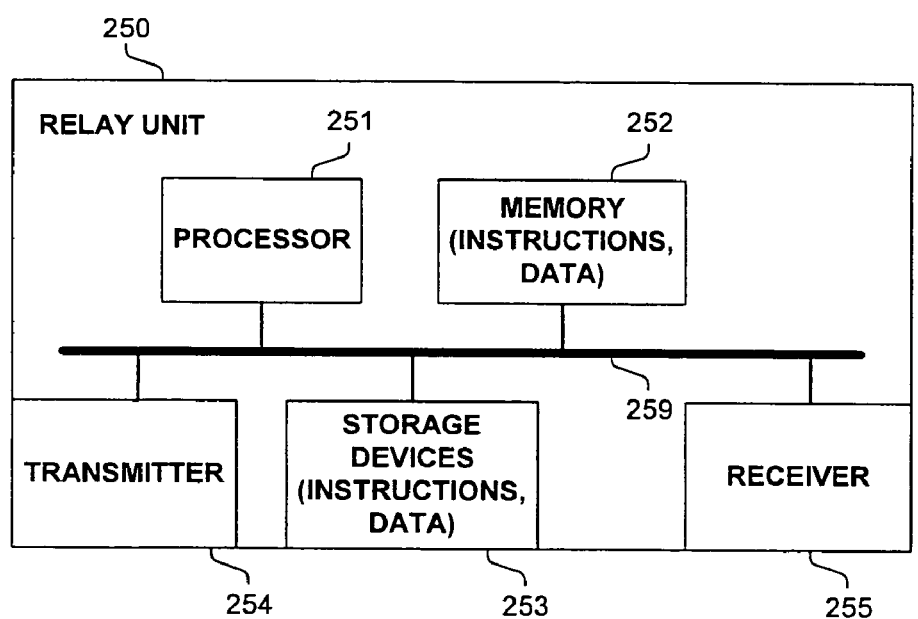
FIG. 2C is a block diagram of a relay unit.

FIG. 2C illustrates a relay unit 250 which may be used to receive, store and retransmit detected performance indicia, measured performance metrics, and video and still images. In one embodiment, relay unit 250 comprises a processor 251, memory 252, storage devices 253, receiver 255 for receiving the information, transmitter 254 for retransmitting received data (and transmitting operations information) to base station 240 (FIG. 2B), and one or more internal communications mechanisms 259 (shown as a bus for illustrative purposes). Memory 252 is one type of computer-readable medium, and typically comprises random access memory (RAM), read only memory (ROM), integrated circuits, and/or other memory components. Memory 252 typically stores computer-executable instructions to be executed by processor 251 and/or data which is manipulated by processor 251 for implementing functionality in accordance with certain embodiments described herein. Storage devices 253 are another type of computer-readable medium, and typically comprise disk drives, diskettes, networked services, tape drives, flash sticks, and other storage devices. Storage devices 253 typically store computer-executable instructions to be executed by processor 251 and/or data which is manipulated by processor 251 for implementing functionality in accordance with certain embodiments described herein. For example, in one embodiment, data corresponding to performance indicia or measurements or video or still images are stored in memory 252 and/or storage devices 253.

Figure 2D:
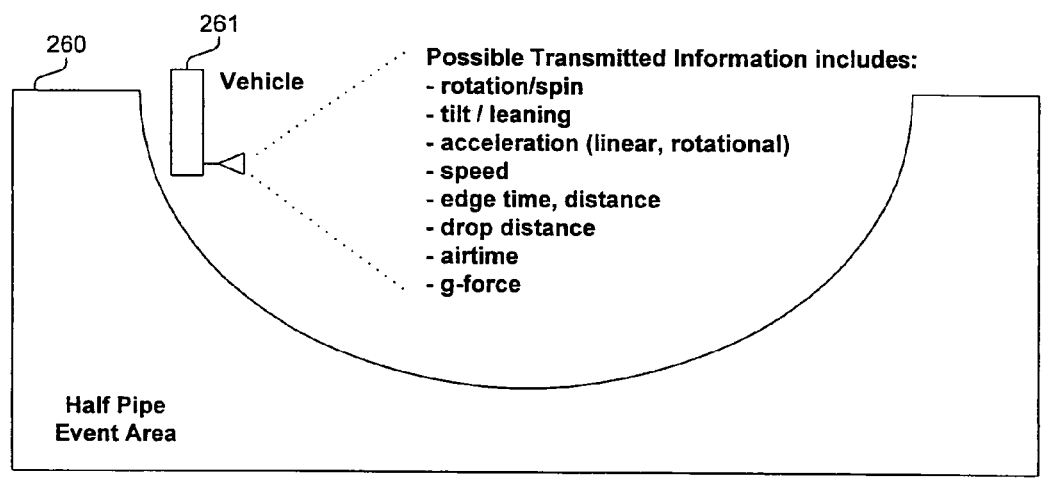
FIG. 2D is a diagram of a half pipe event area and a vehicle.

FIG. 2D provides an example of one type of event area 200 (FIG. 2A)—a half pipe event area 260, such as that often used by skateboarders and snowboarders, along with a vehicle 261. For this half pipe event area 260, vehicles 261 will typically be equipped with sensing units 130 (FIG. 1D) that generate one or more of the following performance metrics: rotation/spin rate and quantity, tilt/leaning information, linear and/or rotational acceleration, speed, edge time and/or distance, drop distance, airtime, and experienced g-force. These performance metrics are typically relayed to either a personal display device or event system (e.g., that illustrated in FIG. 2A).

Figure 3A:
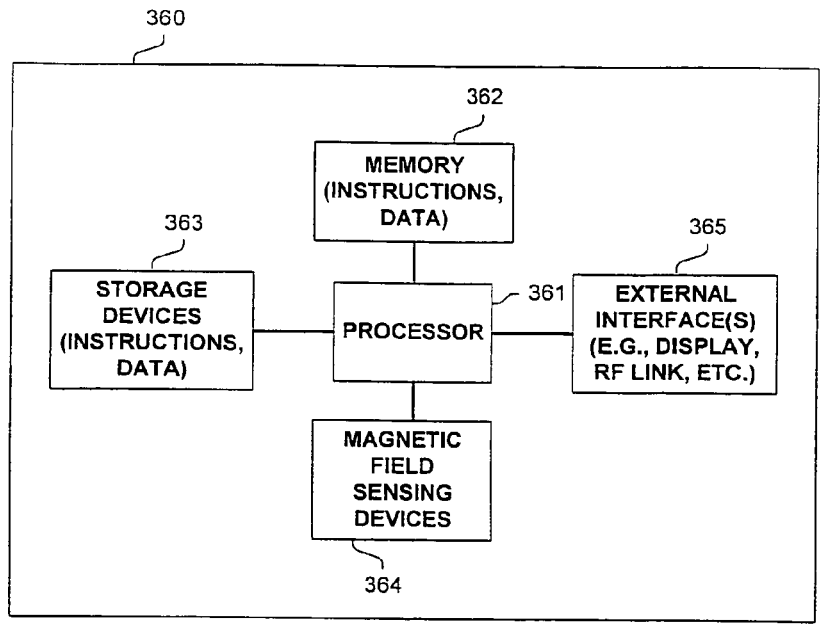
FIG. 3A-B are block diagrams of sensing units for measuring rotation and/or speed.
Figure 3B:
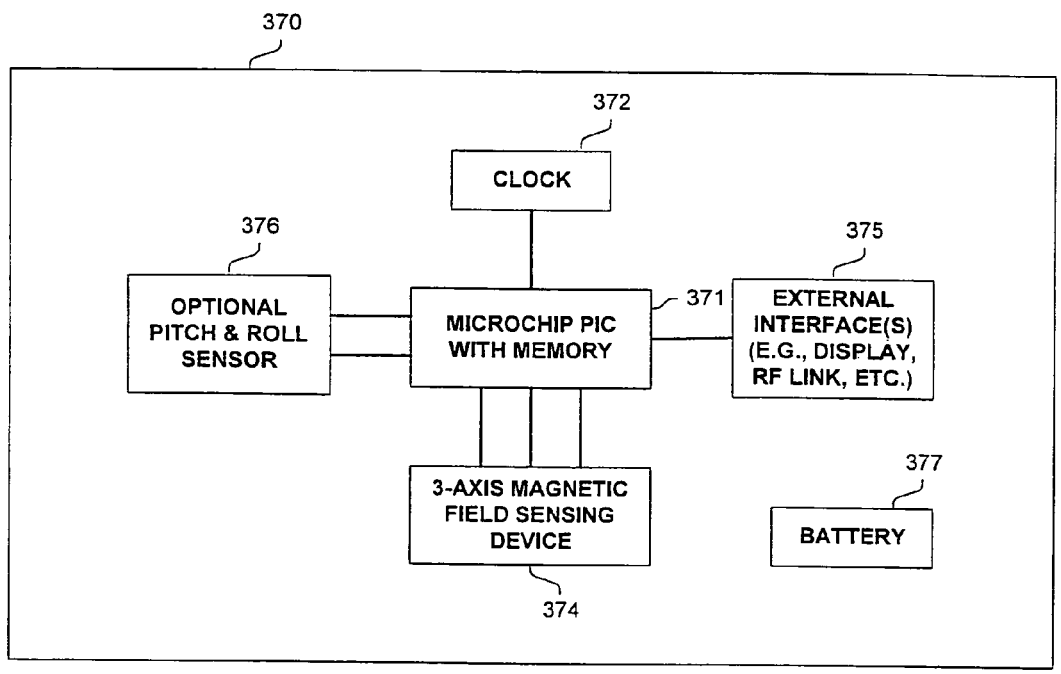

FIGS. 3A-B illustrates embodiments 360 and 370 of a sensing unit 130 (FIG. 1D) for measuring rotation based on measured changes in a magnetic field, such as the Earth's magnetic field. Additionally, embodiments of sensing units 360 and 370 may measure movement of the sensing device through a magnetic field to determine a speed.

Sensing unit 360 typically includes a processor 361, memory 362, storage devices 363, one or more magnetic field sensing devices 364, and one or more external interfaces 365 (such as a display or a radio transmitter for communicating with an event system or personal display device). Sensing unit 370 typically includes a microchip PIC with memory 371 (or processor and memory), clock 372, 3-axis magnetic field sensing device 374, optional pitch and roll sensor 376, one or more external interfaces 375 (such as a display or a radio transmitter for communicating with an event system or personal display device), and a battery source 377. The operation of sensing unit 370 is further described by the flow diagrams of FIGS. 4A-B.

Figure 4A:
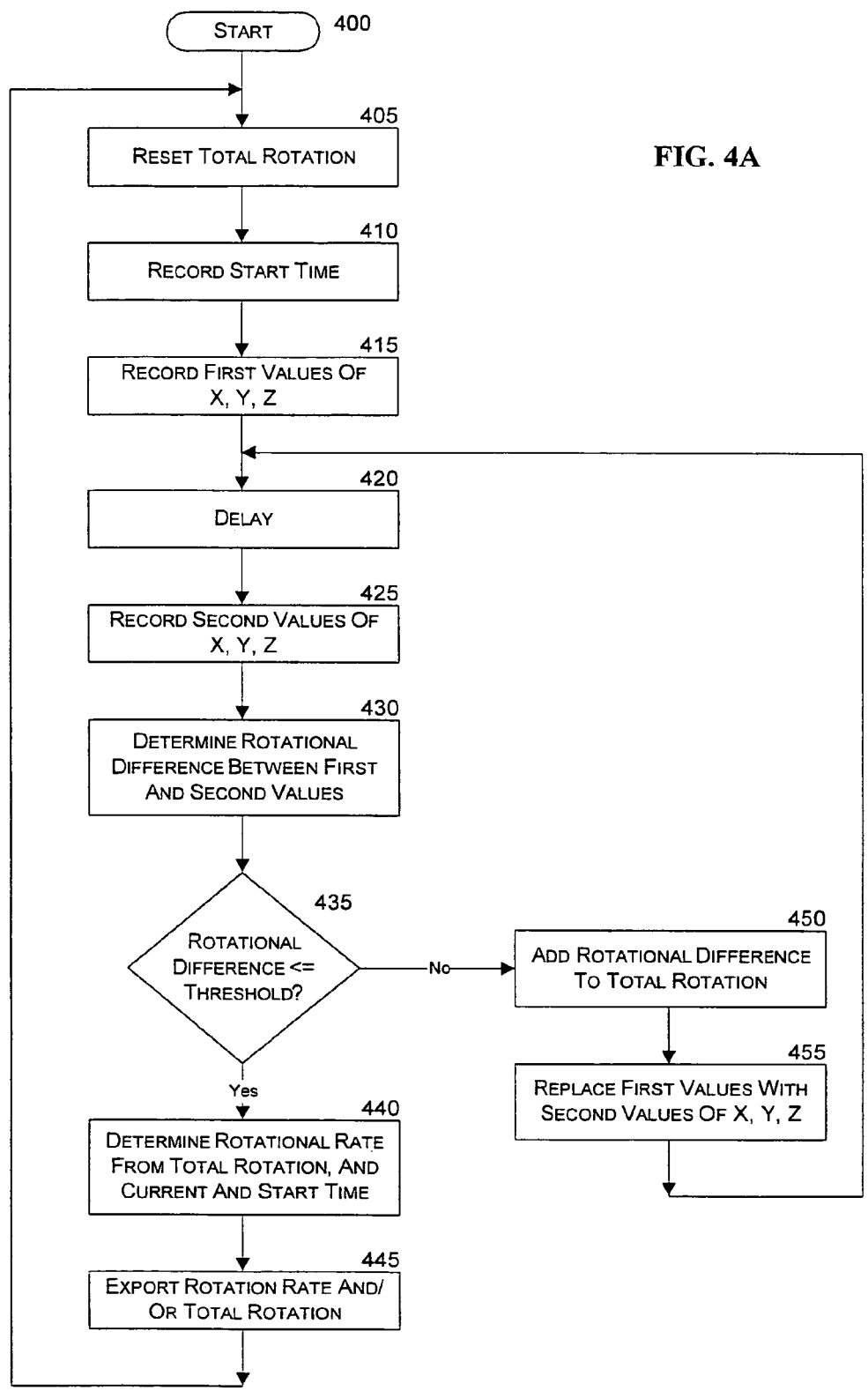
FIG. 4A-B are flow diagrams for measuring rotation.

FIG. 4A is a flow diagram of one embodiment for determining a total rotation and rate of rotation. Processing begins with processing block 400, and proceeds to processing block 405 where a total rotation variable is reset. Next, in processing block 410, the current value of clock 372 (FIG. 3B) is recorded as the start time. Next, in processing block 415, the first x, y, and z values of the 3-axis magnetic field sensing device 374 are recorded. After a delay (e.g., some number of microseconds) indicated by processing block 420, the second x, y, and z values of the 3-axis magnetic field sensing device 374 are recorded in processing block 425. Then, using the first and second recorded values and associated physics and mathematics, the rotational difference is determined in processing block 430. If the determined rotational difference is less than some predetermined threshold (e.g., there is no more rotation) as determined in processing block 435, then the rotational rate is determined in processing block 440. Next, the rotational rate and/or total rotation are displayed or relayed to an event system in processing block 445, with processing returning to processing block 405. Otherwise, in processing block 450, the total rotational difference is increased by the determined rotational difference. Then, the first values are replaced by the second values of x, y, and z in processing block 455, and processing returns to processing block 420.

Figure 4B:
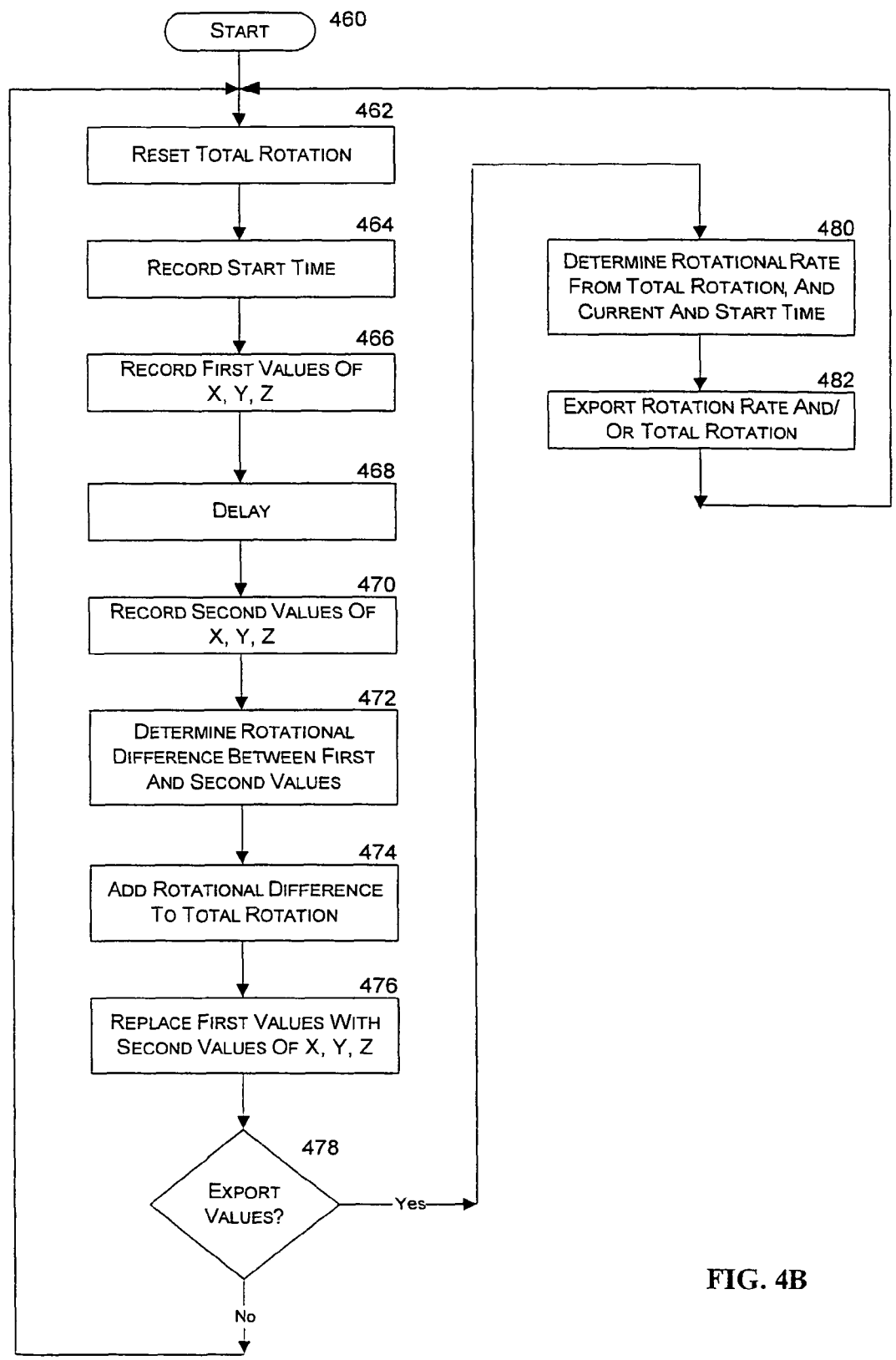

FIG. 4B is a flow diagram of another embodiment for determining a total rotation and rate of rotation. Processing begins with processing block 460, and proceeds to processing block 462 where a total rotation variable is reset. Next, in processing block 464, the current value of clock 372 (FIG. 3B) is recorded as the start time. Next, in processing block 466, the first x, y, and z values of the 3-axis magnetic field sensing device 374 are recorded. After a delay (e.g., some number of microseconds) indicated by processing block 468, the second x, y, and z values of the 3-axis magnetic field sensing device 374 are recorded in processing block 470. Then, using the first and second recorded values and associated physics and mathematics, the rotational difference is determined in processing block 472. Next, in processing block 474, the total rotational difference is increased by the determined rotational difference. Then, the first values are replaced by the second values of x, y, and z, in processing block 476. Then, as determined in processing block 478, if the rotational amount and rate should be exported, then the rotational rate is determined in processing block 480, and the rotational rate and/or total rotation are displayed or relayed to an event system in processing block 482. Processing then returns to processing block 462.

Figure 5A:
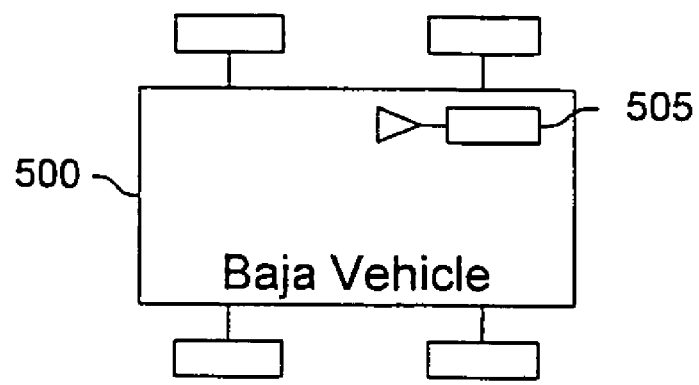
FIGS. 5A-B are block diagrams of a vehicle in the form of a baja race car and corresponding sensing device.
Figure 5B:
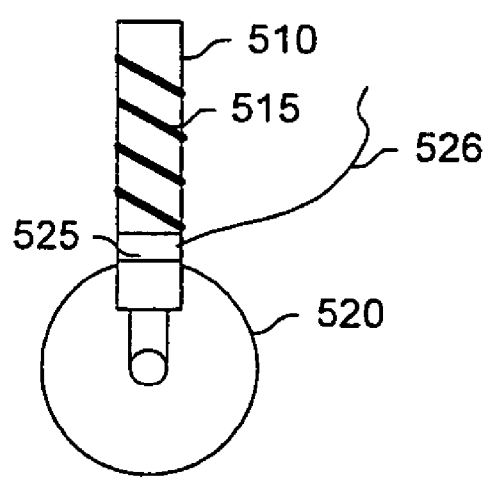

FIGS. 5A-B illustrate another embodiment of a vehicle 500 and sensing unit 505 which may be used to provide airtime and other information (e.g., performance metrics) related to Baja racing or other wheeled vehicles, in real-time, if desired, to television or judging centers, event systems, personal display devices and/or the drivers of these vehicles. In this embodiment, vehicle 500 is a Baja motor vehicle. Sensing unit 505 is further illustrated in FIG. 5B, in which a sensing device 525 is mounted to the vehicle in one or more places to monitor the airtime for one or all the wheels. Various embodiments of sensing device 525 employ contact closures, stress sensing devices, accelerometers, and/or devices that measure the position of a shock absorber 510 or coil spring 515 for a wheel 520 of the vehicle 500. Sensing device 525 relays detected information over link 526 to the rest of the sensing unit (e.g., to a microchip PIC or processor) (or element 525 could be replaced by an entire sensing unit which relays data wirelessly, for example, to an event system or directly to a base station).

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof.

What is claimed is:

1. A mobile image capture system, comprising:
a sensing unit comprising at least one sensor and at least one camera, wherein the at least one sensor and the at least one camera are attached to an article of footwear worn by a participant, and wherein the at least one camera is constructed and arranged to view the participant while the participant is wearing the article of footwear, the at least one camera capturing a sequence of images of the participant while wearing the article of footwear; and processing electronics for storing data representing the captured sequence of images or for relaying data representing the captured sequence of images to a computer or a network.

2. The system of claim 1, wherein the processing electronics relay data representing the captured at least one image to the computer or the network in real-time.

3. The system of claim 2, wherein the at least one image includes a sequence of images.

4. The system of claim 1, wherein the processing electronics include digital video memory for storing data representing the captured at least one image.

5. The system of claim 1, wherein the sensing unit further comprises an interface for transmitting data representing the captured image to the computer or the network.

6. The system of claim 1, further comprising an antenna and relay electronics for transferring data representing the captured image to a remote location.

7. The system of claim 1, wherein the computer includes a CD or DVD ROM storage device for storing data representing the captured at least one image.

8. The system of claim 1, wherein the at least one image includes a sequence of images.

* * * * *